United States Patent
Brie

(10) Patent No.: US 6,425,194 B1
(45) Date of Patent: Jul. 30, 2002

(54) VARIABLE CUSHIONING STRUCTURE

(76) Inventor: Serge Brie, 10170 Place de Beaumarchais, Quebec (CA), G2B 4N4

(*) Notice: Subject to any disclaimer, the term of this patent is extended or adjusted under 35 U.S.C. 154(b) by 0 days.

(21) Appl. No.: 09/673,314

(22) PCT Filed: Apr. 15, 1999

(86) PCT No.: PCT/CA99/00327

§ 371 (c)(1),
(2), (4) Date: Dec. 5, 2000

(87) PCT Pub. No.: WO99/52387

PCT Pub. Date: Oct. 21, 1999

(30) Foreign Application Priority Data

Apr. 15, 1998 (CA) .................................................. 2231802

(51) Int. Cl.$^7$ .......................... B29C 33/40; A61F 5/00; A43B 7/06; A43B 13/18; A43B 21/36
(52) U.S. Cl. ................................ 36/43; 36/44; 36/3 B; 36/28; 36/141; 602/6; 264/40.1; 264/220; 264/222
(58) Field of Search .............................. 36/44, 43, 29, 36/3 B, 114, 3 R, 28, 140, 141; 700/264, 222, 223; 602/6, 7, 8; 264/40.1, 222, 223, 220, 219

(56) References Cited

U.S. PATENT DOCUMENTS

| | | |
|---|---|---|
| 4,215,492 A | 8/1980 | Sandmeier |
| 4,223,455 A | 9/1980 | Vermeulen |
| 4,224,746 A | 9/1980 | Kim |
| 4,345,387 A | 8/1982 | Daswick |
| 4,468,869 A | 9/1984 | Fukuoka |
| 4,509,510 A * | 4/1985 | Hook ............................ 36/44 |
| 4,541,185 A | 9/1985 | Chou |
| 4,598,484 A | 7/1986 | Ma |
| 4,619,055 A | 10/1986 | Davidson |
| 4,733,483 A | 3/1988 | Lin |
| 4,776,109 A | 10/1988 | Sacre |
| 4,813,160 A | 3/1989 | Kuznetz |
| 4,821,200 A * | 4/1989 | Oberg |
| 4,831,749 A | 5/1989 | Tsai |
| 4,841,647 A * | 6/1989 | Turucz ........................... 36/44 |
| 4,843,738 A * | 7/1989 | Masuda .......................... 36/44 |
| 4,890,235 A * | 12/1989 | Reger et al. ................. 264/222 |
| 4,896,441 A | 1/1990 | Galasso |
| 5,134,735 A | 8/1992 | Rose |
| 5,607,749 A * | 3/1997 | Strumor ......................... 36/29 |
| 5,619,809 A | 4/1997 | Sessa |
| 5,746,952 A * | 5/1998 | Marshall ..................... 264/40.1 |
| 5,815,949 A * | 10/1998 | Sessa ........................... 36/3 B |
| 6,000,082 A * | 12/1999 | Nguyen ........................ 36/140 |
| 6,042,759 A * | 3/2000 | Marshall .................... 264/40.1 |

FOREIGN PATENT DOCUMENTS

| | | | | |
|---|---|---|---|---|
| EP | 0037462 | 10/1981 | | |
| EP | 0429849 | 6/1991 | | |
| EP | 0578618 | 1/1994 | | |
| FR | 837363 | 11/1938 | | |
| GB | 738919 | 10/1955 | | |
| GB | 1111737 | 5/1968 | | |
| WO | WO 87/02551 | * 5/1987 | .................. | 36/140 |

\* cited by examiner

*Primary Examiner*—Anthony Stashick
(74) *Attorney, Agent, or Firm*—Collard & Roe, P.C.

(57) ABSTRACT

A cushioning sole for use in contact with a foot, the foot being characterized by a specific shape relief and pressure map. The cushioning structure comprises a central layer of a rubber-like thermoplastic material having an upper surface devised to be in contact with the foot and having a shape relief conforming the specific shape relief of the foot, and a bottom surface opposite the upper surface. The cushioning sole further comprises a layout of space-apart anatomical pressure-receiving fingers made integrally with the central layer and protruding from at least one of the upper surface and bottom surface. Each of the pressure-receiving fingers has a predetermined height and diameter. The layout, the height and the diameter of the pressure-receiving fingers are determined in function of the physical characteristics of the rubber-like thermoplastic material and the specific pressure map of the foot, whereby the overall pressure-receiving fingers suit the specific pressure map of the foot.

3 Claims, 5 Drawing Sheets

VARIABLE CUSHIONING STRUCTURE

CROSS REFERENCE TO RELATED APPLICATIONS

Applicant claims priority under 35 U.S.C. §119 of Canadian Application No. 2,231,802 filed Apr. 15, 1998. Applicant also claims priority under 35 U.S.C. §120 of PCT/CA99/00327 filed Apr. 15, 1999. The international application under PCT article 21(2) was published in English.

FIELD OF THE INVENTION

The present invention relates to a cushioning structure suitable for use as a shoe sole or insole but also as an insert structure for cushioning any object that requires cushioning properties such as a seat covering, a bicycle seat or a mattress. It also relates to a method of making such cushioning structure.

BACKGROUND ART

Commonly used in prior art for cushioning a car seat, a chair, a mattress or any other object devised to be in contact with a human or animal body part that requires cushioning properties, there is the traditional foam pad which consists of a uniform thickness pad having a uniform density throughout and deprived of any particular aeration system.

The prior art also teaches a number of structures used as shoe soles and consisting of a central layer of flexible material incorporating a plurality of asperities distributed thereon and acting as individual suspension. Examples of such prior art shoe soles are given in U.S. Pat. Nos. 4,345,387; 4,541,185; 4,733,483; 4,831,749 and 4,896,441.

Also disclosed in prior art, there are different types of soles incorporating pumping means for aerating the foot during the walking movement of the user. Examples of such prior art shoe soles are given in U.S. Pat. Nos. 4,215,492; 4,223,455; 4,224,746; 4,468,869; 4,776,109; 4,813,160; 4,831,749 and 5,619,809.

There is also a number of orthopedic innersoles disclosed in prior art which provide an adequate conformation to the particular shape of the bottom of the foot in order for example to correct eventual defects to the user's foot. Such innersoles are disclosed in U.S. Pat. Nos. 4,598,484; 4,733,483 and 4,896,441.

Although many developments have been made, especially in the shoe industry, for providing comfortable soles, there is still a need for a cushioning structure devised to be in contact with a human or animal body part and that optimally suits the physical characteristics of the body part. There is also a need for a cushioning structure for use in contact with a body part that could provide in the same time a real comfort adapted to the physical characteristics of the user and an efficient aeration system. Also needed is such a structure for cushioning any object that requires cushioning properties such as a seat covering, a bicycle seat, a shoe sole or a mattress.

SUMMARY OF THE INVENTION

Therefore an object of the present invention is to propose a cushioning structure for use in contact with a human or animal body part and that optimally suits the physical characteristics of the body part.

Another object of the present invention is to propose a method of making such a cushioning structure.

In accordance with the present invention, one object is achieved with a cushioning structure for use in contact with a human or animal body part, the body part being characterised by a pressure map. The cushioning structure comprises a central layer of a rubber-like thermoplastic material having an upper surface and a bottom surface. The upper surface is devised to be in contact with the body part and preferably has a shape relief conforming a specific shape relief of the body part.

The structure further comprises a layout of space-apart anatomical pressure-receiving fingers made integrally with the central layer and protruding from at least one of the upper surface and bottom surface. Each of the pressure receiving fingers has a predetermined height and diameter. The structure is characterised in that the layout, the height and the diameter of the pressure-receiving fingers is determined in function of the physical characteristics of the rubber-like thermoplastic material and of the specific pressure map of the body part, whereby the overall pressure-receiving fingers suits the specific pressure map of the body part.

The layout, the height and the diameter of the pressure-receiving fingers are determined by computer modelling.

Also preferably, the cushioning structure further comprises a layout of air holes distributed between the pressure-receiving fingers and extending across the central layer from the upper surface to the bottom surface.

In a preferred embodiment of the present invention, the pressure-receiving fingers protrude only from the bottom surface and the structure further comprises on the upper surface thereof a plurality of massaging buttons to massage the body part.

Also in accordance with the present invention, another object is achieved with a method of making a cushioning structure as defined hereinbefore comprising the steps of:

a) providing the pressure map of the body part;

b) determining an implantation map of the anatomical pressure receiving fingers in function of the pressure map, the implantation map giving the layout, the height and the diameter of each pressure receiving finger;

c) providing an injection mould conforming with the implantation map obtained in step b) and preferably with the shape relief map of the body part; and d) moulding by injection the cushioning structure in the mould obtained in step c).

The implantation map is determined by computer modelling.

The cushioning structure according to the invention is intended to be used as an insert structure for cushioning any object that requires cushioning properties such as a shoe sole or insole, a seat covering, a bicycle seat or a mattress.

An advantage of a cushioning structure according to the present invention over the prior art cushioning structures is that it is optimally comfortable for the user as it is obtained by taking into account the specific pressure map of the body part to which it is intended to be in contact with. Another advantage of the present invention is that it proposes a simple method to manufacture at once many different types of cushioning structures suiting different purposes.

As stated previously, the shape, size, height and composition of the anatomical pressure-receiving fingers may vary and the choice of these characteristics is determined according to the specific pressure points and the density required at specific locations of the structure in use. Of course, the thickness of the central layer can also be adjusted. For example, if the cushioning structure is used in the making of a bicycle seat, the density may be adjusted for providing an ergonomic and comfortable seat. Such cushioning structure could also be used as a shoe sole, the central layer and pressure-receiving fingers having a variable thickness providing an orthopedic profile for the shoe sole.

A non restrictive description of a preferred embodiment will now be given with reference to the appended drawings.

DESCRIPTION OF A PREFERRED EMBODIMENT

Figure 1:
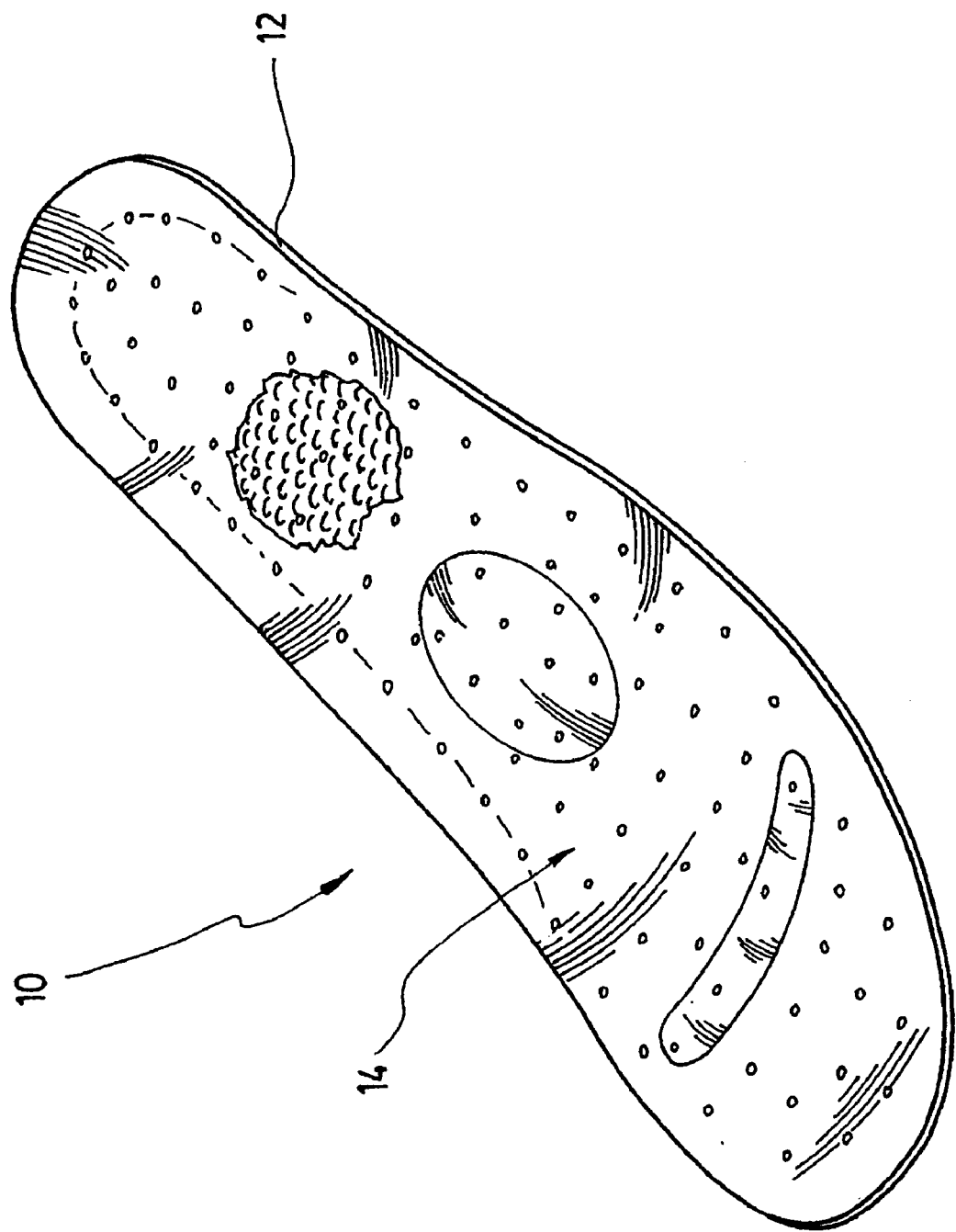
FIG. 1 is a top perspective view of a preferred embodiment of a cushioning structure according to the present invention used as a shoe sole.
Figure 2:
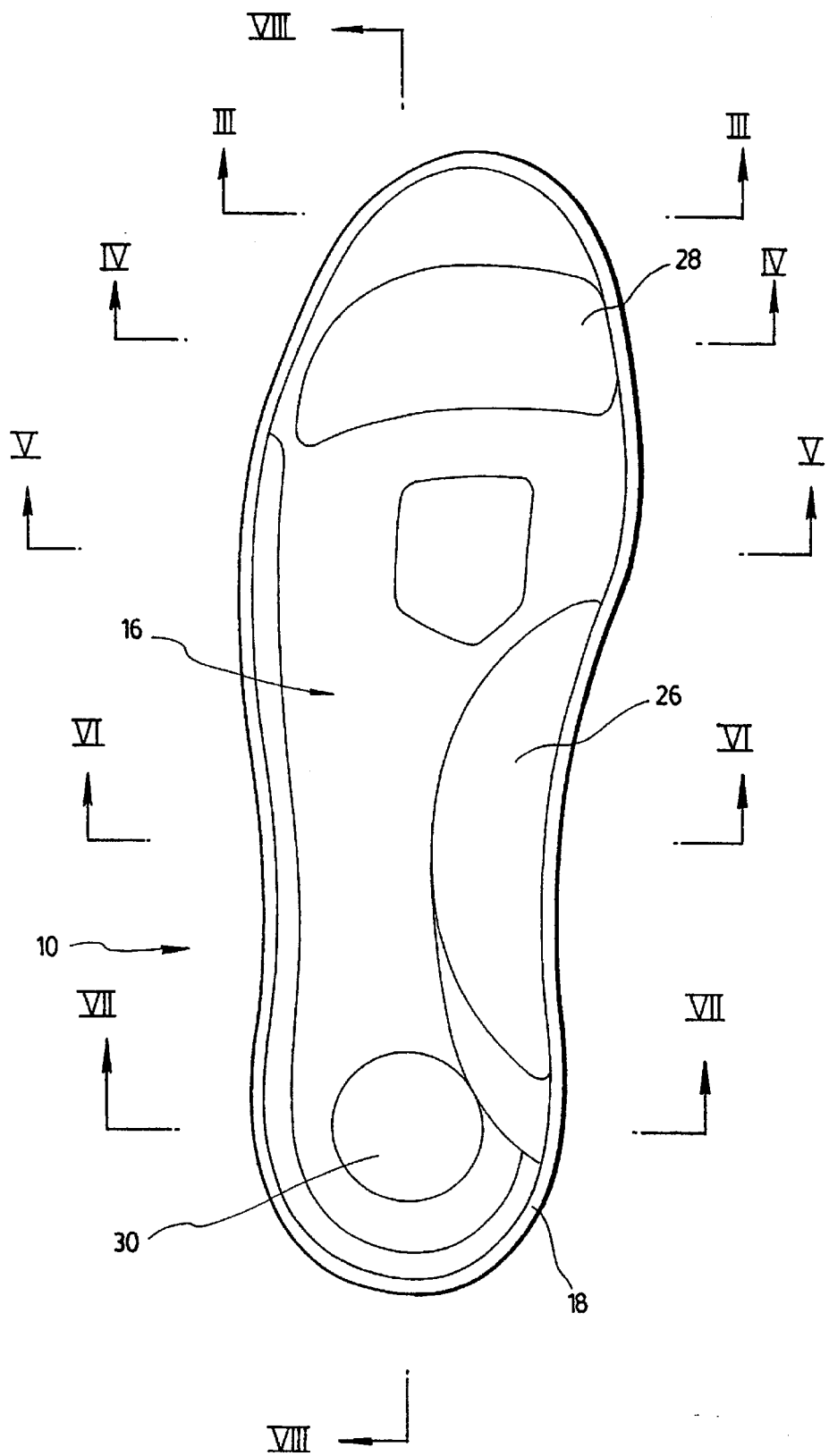
FIG. 2 is a bottom view of the cushioning structure shown in FIG.1.
Figure 3:
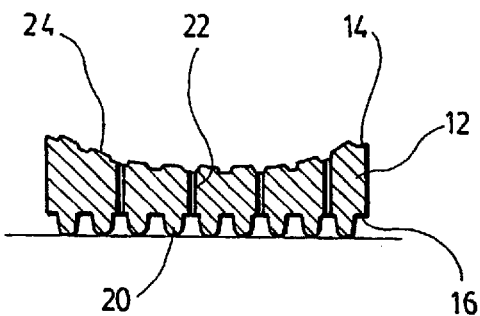
FIG. 3 is a cross-sectional side view of the cushioning structure shown in FIG. 2 taken along III—III.
Figure 4:
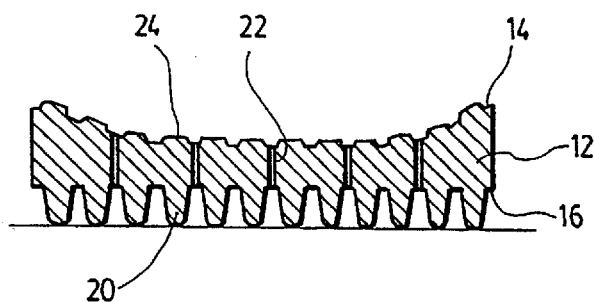
FIG. 4 is a cross-sectional side view of the cushioning structure shown in FIG. 2 taken along line IV—IV.
Figure 5:
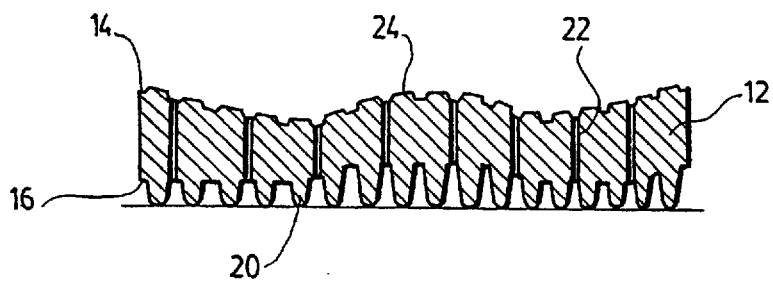
FIG. 5 is a cross-sectional side view of the cushioning structure shown in FIG. 2 taken along line V—V.
Figure 6:
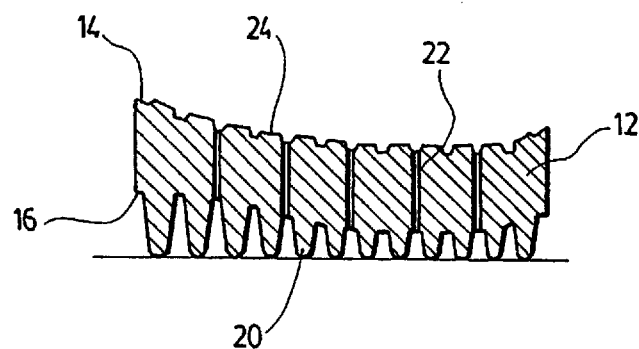
FIG. 6 is a cross-sectional side view of the cushioning structure shown in FIG. 2 taken along line VI—VI.
Figure 7:
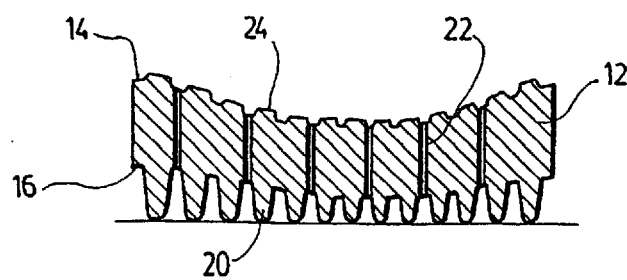
FIG. 7 is a cross-sectional side view of the cushioning structure shown in FIG. 2 taken along line VII—VII.
Figure 8:
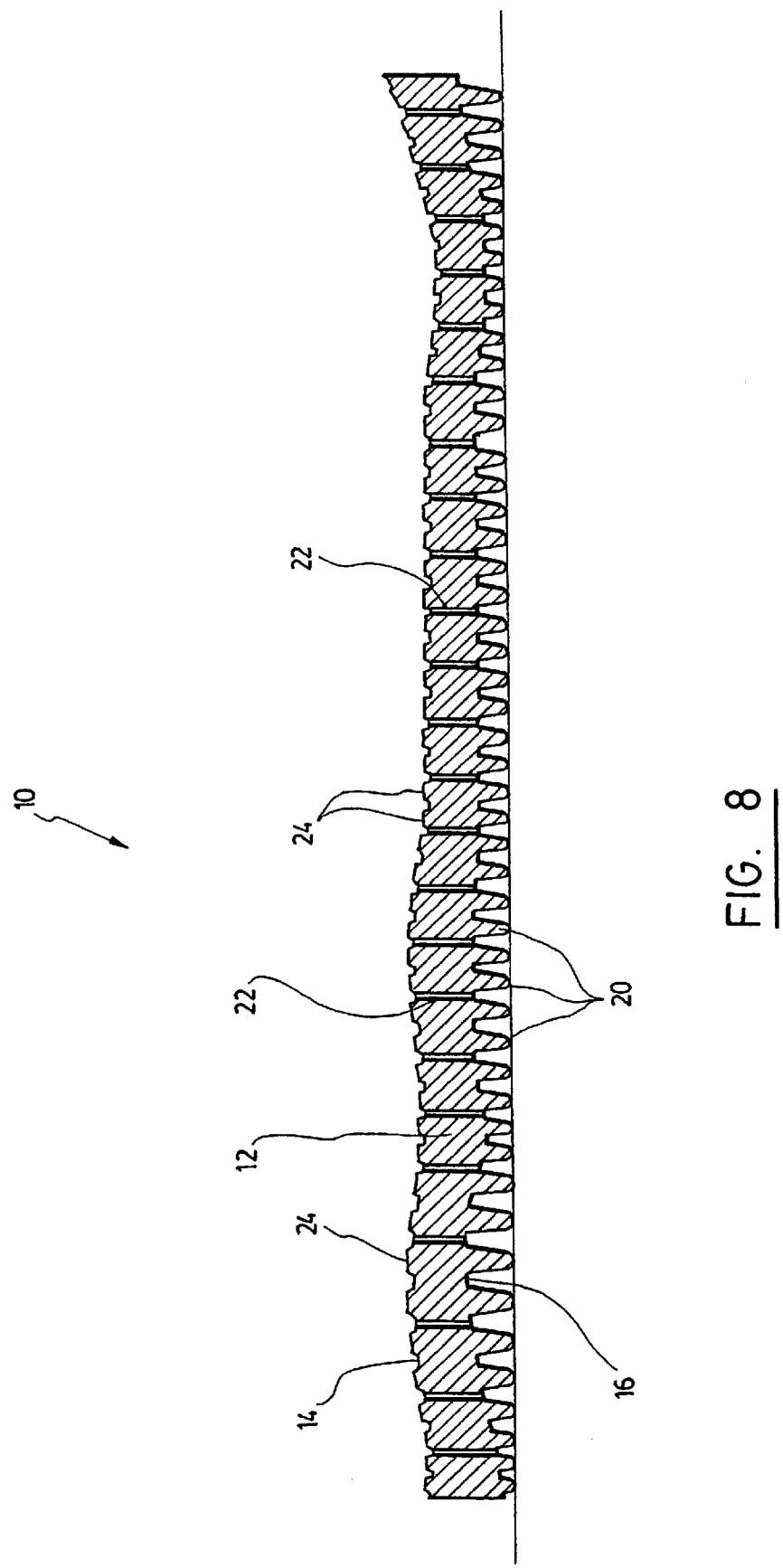
FIG. 8 is a cross-sectional side view of the cushioning structure shown in FIG. 2 taken along line VIII—VIII.

The accompanying drawings illustrate one preferred embodiment of the invention. In that case, the use of the cushioning structure is used as a shoe sole or insole.

Referring to FIGS. 1 to 8, the cushioning insole (10) is for use in contact with a foot characterised by a specific shape relief and pressure map. The creation of a pressure map giving the points of pressure of a body part such as a foot either at rest, walking or running is already known in prior art and is commonly performed in medicine. It may be obtained, for example, by the imprint of the bottom surface of the foot on a sheet. Then a formula is used to calculate the pressure points corresponding to the imprints obtained.

The cushioning insole (10) comprises a single central layer (12) of a rubberlike thermoplastic material, preferably selected from among natural rubber and synthetic rubber and characterised by the following physical characteristics: a modulus of elasticity, a viscosity in function of the temperature and the speed of shearing, a modulus of relaxation, a thermal conductivity and of a specific heat.

The single central layer (12) has an upper surface (14) devised to be in contact with the foot. As can be appreciated from FIG. 1, this upper surface (14) preferably has a shape relief which conforms the shape of the foot. In this preferred embodiment, the bottom surface (16) has an outline frame (18) shaped like a foot.

The bottom surface (16) has a layout of space-apart anatomical pressure-receiving fingers (20) made integrally with the central layer (12) and protruding, in that case, only from the bottom surface (16) of the layer (12).

Referring to FIGS. 3 to 8, each of the pressure-receiving fingers (20) has a predetermined height and diameter. The layout, the height and the diameter of the pressure-receiving fingers (20) are determined by calculation in function of the physical characteristics of the rubber-like thermoplastic material and the specific pressure map of the foot, whereby the overall pressure-receiving fingers (20) suit optimally the specific pressure map of the foot. Preferably, the layout, the height and the diameter of the pressure-receiving fingers (20) are determined by computer modelling.

To promote air circulation over the upper surface (14) of the insole (10) and also between the upper (14) and bottom surface (16) of the central layer (12), the insole (10) further comprises a layout of air holes (22) distributed between the pressure-receiving fingers (20) and extending across the central layer (12) from the upper surface (14) to the bottom surface (16).

As illustrated, the upper surface (14) preferably comprises a plurality of small massaging buttons (24) projecting upwardly from the central layer (12). These small buttons (24) can produce a massage effect to the user.

Thanks to the combination of the pressure-receiving fingers (20), the massaging buttons (24) and the air holes (18), the insole (10) acts as an aerated air cushion. When pressure is applied on the insole (10), the air between the fingers (20) is expelled through the air holes (22). When the pressure is removed, the air returns back through these air holes (22) thereby allowing the insole (10) to be aerated. Although the holes (22) illustrated in this preferred embodiment are of the same size and are distributed evenly over the surface of the insole (10), it should be understood that these holes (22) may also be distributed unevenly and be different in their size.

The pressure-receiving fingers (20) may have variable shapes (cubic, spherical, cylindric, . . . ), size, height and distribution over the central layer, depending on the density and support required at specific locations of the insole. For example, in the illustrated preferred embodiment, the insole (10) comprises pressure-receiving fingers (20) which are longer in order to define the area under the arch of the foot (26) and under the toe grip (28). The same insole (10) also comprises pressure-receiving fingers (20) which are shorter in order to define the area under the heel (30). The variation in the characteristics of the central layer (10), pressure-receiving fingers (20) and buttons (21) thus permits to provide an anatomical profile adapted for an insole. It has to be understood that an insole which is intended to be used in a shoe for walking will have a pattern of pressure-receiving fingers different from the pattern of an insole intended to be used in a shoe adapted for running or other purposes. As well, the pattern of an insole intended to be used in the shoe of a person having orthopeadic problems will be much different but will suit optimally that person.

The pressure-receiving fingers (20) may be made of the same material as the central layer (12), or of a different material. Preferably, the central layer (12) and the pressure-receiving fingers (20) are made of natural or synthetic rubber. The layer (12) and the fingers (20) can be full, hollow, or filled with a material different from natural or synthetic rubber such as foam or gel.

The method of making a cushioning insole (10) as described above comprises the steps of:

a) providing the pressure map of the foot as described above;

b) providing a shape relief map of the human body part;

c) determining an implantation map of the anatomical pressure-receiving fingers in function of the physical characteristics of the thermoplastic material used, the pressure map, the implantation map giving the layout, the height and the diameter of each pressure-receiving finger;

d) providing an injection mould conforming with the implantation map obtained in step b) and the shape relief map; and e) moulding by injection the cushioning structure in the mould obtained in step d).

Figure 9:
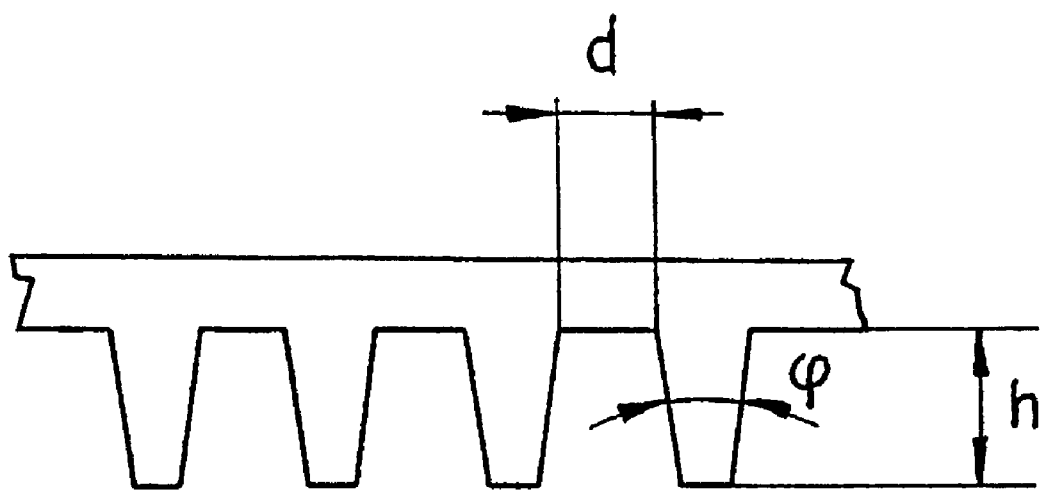
FIG. 9 is a parametrical model of a pressure-receiving finger.

The implantation map is preferably determined by computer modelling. More particularly, at first, a parametrical model of the fingers is prepared, as illustrated in FIG. 9. From that model, a number of structural analyses of the deformation of the insole for a unitary charge is performed with different values of d, φ and h.

From these analyses, the following relation between the deformation D of the insole and d, φ and h is established:

$$D = f(d, \phi \text{ and } h) \quad (1)$$

Since a proportional relation between d, φ and h of the type:

$$D = k_1 * L$$
$$\phi = k_2 * L$$
$$h = k_3 * L$$

where L is a shape parameter, can be obtained from the design of the insole chosen. The relation (1) may be transformed into the following parametrical form:

$$D = f(L) \quad (2)$$

Equation (2) allows the establishment of a relation between the deformation of the insole and the geometry of the fingers. It is thus possible to determine the disposition and the shape of the fingers to be used in any area of the insole for a given deformation and pressure.

A software module using that relation is written, which is then used to predict the implantation of the fingers for a given pressure map of a body part. Then, an injection mold conforming the implantation map obtained is manufactured and the cushioning structure is molded by injection in that mold.

Although preferred embodiments of the invention have been described in detail herein and illustrated in the accompanying drawings, it is to be understood that the invention is not limited to these precise embodiments and that various changes and modifications may be effected therein without departing from the scope or spirit of the invention.

What is claimed is:

1. A method of making a cushioning structure for use in contact with a body part, the cushioning structure comprising a central layer of a cushioning thermoplastic material, the central layer having:

an upper surface devised to be in contact with said body part and a bottom surface opposite said upper surface; and a layout of spaced-apart anatomical pressure receiving fingers made integrally with the central layer and protruding from at least one of said upper surface and said bottom surface, each of said pressure receiving fingers having a predetermined height and diameter;

the method comprising the steps of;

a) providing a pressure map of the body part;

b) determining by computer modelling an implantation map of the anatomical pressure-receiving fingers in function of the pressure map, the implantation map giving the layout, the height and the diameter of each pressure receiving finger;

c) providing an injection mould conforming with the implantation map obtained in step b) and d) moulding by injection the cushioning structure in the mould obtained in step c).

2. A method of making a cushioning structure (10) as defined in claim 1 characterised in that it comprises, between step a) and b), the step of providing a shape relief map of the body part and wherein in step c) the mould provided conforms the shape relief map.

3. A method of making a cushioning structure as defined in claim 1, wherein the cushioning structure is selected from the group consisting of an insole, a sole, a seat and a saddle.

* * * * *